US 8,166,053 B2

(12) United States Patent
Zhou et al.

(10) Patent No.: US 8,166,053 B2
(45) Date of Patent: Apr. 24, 2012

(54) METHOD AND APPARATUS FOR SCHEMA-DRIVEN XML PARSING OPTIMIZATION

(75) Inventors: Dong Zhou, San Jose, CA (US); Ali Ismael, Los Altos, CA (US); Yu Song, Milpitas, CA (US); Nayeem Islam, Palo Alto, CA (US)

(73) Assignee: NTT DoCoMo, Inc., Tokyo (JP)

( * ) Notice: Subject to any disclaimer, the term of this patent is extended or adjusted under 35 U.S.C. 154(b) by 2225 days.

(21) Appl. No.: 10/971,539

(22) Filed: Oct. 21, 2004

(65) Prior Publication Data
US 2005/0097455 A1    May 5, 2005

Related U.S. Application Data

(60) Provisional application No. 60/516,037, filed on Oct. 30, 2003.

(51) Int. Cl.
*G06F 7/00* (2006.01)
(52) U.S. Cl. .......... 707/755; 707/804; 717/106
(58) Field of Classification Search .......... 707/101, 707/755, 804; 715/513, 234–242; 717/106, 717/140; 719/328–330
See application file for complete search history.

(56) References Cited

U.S. PATENT DOCUMENTS

| | | | |
|---|---|---|---|
| 6,763,499 B1* | 7/2004 | Friedman et al. | 715/513 |
| 6,959,415 B1* | 10/2005 | Soderberg et al. | 715/513 |
| 2002/0147774 A1 | 10/2002 | Lisiecki et al. | 709/203 |
| 2003/0115548 A1* | 6/2003 | Melgar | 715/513 |
| 2003/0159112 A1* | 8/2003 | Fry | 715/513 |
| 2003/0163603 A1 | 8/2003 | Fry et al. | 719/328 |
| 2003/0172348 A1* | 9/2003 | Fry et al. | 715/513 |
| 2004/0073870 A1* | 4/2004 | Fuh et al. | 715/513 |

OTHER PUBLICATIONS

"Java Architecture for XML Binding (JAXB)", http://xml.coverpages.org/jaxb.xml, last modified Jan. 14, 2003 (hereinafter referred as JAXB).*
Yoshikawa, Masatoshi et al "XRel: A Path-Based Approach to Storage and Retrieval of XML Document Using Relational Databases" ACM Transactions on Internet Technology, vol. 1, No. 1, Aug. 2001, pp. 110-141.

* cited by examiner

*Primary Examiner* — Vei-Chung Liang
(74) *Attorney, Agent, or Firm* — Haynes and Boone, LLP

(57) ABSTRACT

Schema-driven XML parsing techniques allow an XML parser to optimize its parsing process by composing parse and to dynamically generate parsing code components based on XML schema definition for the targeted XML document. These techniques reduce the XML parsing time and reduce the memory requirement during parsing process. Further, a reconfigurable parser is provided which is guided during parsing of the XML document by XML element lexicographical information and state transition information extracted from a schema associated with the XML document. Pre-allocated element object pools may be provided based on the schema analysis to reduce the requirements for dynamic memory allocation and de-allocation operations.

16 Claims, 6 Drawing Sheets

METHOD AND APPARATUS FOR SCHEMA-DRIVEN XML PARSING OPTIMIZATION

CROSS REFERENCE TO RELATED APPLICATIONS

The present application claims priority to U.S. provisional application No. 60/516,037 filed on Oct. 30, 2003, incorporated herein by reference.

BACKGROUND OF THE INVENTION

1. Field of the Invention

The present invention relates to methods and systems for data exchange in an information processing system. In particular, the present invention relates to providing an optimized parser for processing a structured document (e.g., a XML document) in an information processing system.

2. Discussion of the Related Art

XML is a platform-independent text-based document format[1] designed to be used in structured documents maintained in an information processing system. XML documents (e.g., forms) have become the favored mechanism for data exchange among application programs sharing data over a network (e.g., the Internet). XML documents have the advantages that (a) the information in an XML document is extensible (i.e., an application program developer can define a document structure using, for example, an XML schema description), and (b) through the XML schema, an application developer can control the range of values that can be accepted for any of the XML element or attribute in the structured document. For example, in an XML schema-defined form for a pair of shoes, the application

[1] In this description, the platform-independent text-based document format means a text format for defining a document which is independent of the underlying software platform (e.g., the operating system), the underlying hardware platform, or both.

program developer may constrain the shoe size attribute accepted by the form to be between 5 and 12. As a result, the form would reject as invalid input a shoe size of 100.

Because of these advantages, XML is widely used in consumer application programs. However, additional processing overhead is imposed on the application program to allow XML to be read and edited easily by a human using a word processor as interface, because the structured data in an XML document are required to be parsed by the application into representations that can be manipulated in the computer by the application program. Parsing requires intensive computational resources, such as CPU cycles and memory bandwidth, as the application program processes the XML elements or attributes one character at a time, in addition to implementing the higher level processing requirements of the XML schema. In a typical XML document, there can be a large number of elements and attributes which are defined in the schema using different data types and constraints. Character-matching is not efficient in existing hardware implementations, such as those based on IA32 and ARM architectures.

Parsers for documents written in numerous languages have been developed and used throughout the history of computers. For example, the first widely accepted parsers (which also validate) for XML are based on the W3C Document Object Model (DOM). DOM renders the information on an XML document into a tree structure. Thus, a parser based on DOM constructs a "DOM tree" in memory to represent the XML document, as it reads the XML document. The DOM tree is then passed to the application program which traverses the DOM tree to extract its required information. Constructing a DOM tree in memory is not only time-consuming, it requires a large amount of memory. In fact, the memory occupied by a DOM tree is usually 5-10 times greater than that of occupied by the original XML document. One optimization constructs a partial DOM tree in memory as needed to reduce the memory requirement and the processing time.

Alternatively, an XML document may be parsed based on a streaming model. Parsers using the streaming model include SAX and Pull. Under the streaming model, rather than a parse tree, a parser outputs a continuous stream of XML elements, together with the values of their attributes, as the XML document is parsed. Typically, such a parser reads from the XML document one XML element at a time, and passes to the consuming application the values of the element and their associated attributes. Although a streaming-based parser is efficient in its memory and processing speed requirements, such a parser merely tokenizes a string into segments of text without interpretation. The interpretation of data contained in each text segment is entirely left to the consuming application program. Thus, the burden of XML processing—which is to provide data in an XML document to the application program in a manner that can be readily used by the application program—is shifted from the parser to the consuming application program.

A parser may or may not validate an XML document. Validation is the process by which each parsed XML element is compared against its definition defined in an XML schema (e.g., an XML DTD file). Validation typically requires string pattern-matching as the validation program searches the multiple element definitions in the XML schema. A conventional approach to simplify validation is to convert the definitions of an XML schema into component models, expressed as a series of Java bean classes. An application program may then check the XML elements using methods provided in the Java bean classes. While schema conversion methods may speed up both the parsing and the validation processes to some limited degree, such conversions do not provide the fast string pattern-matching desired in XML parsing and validating.

As is apparent from the above, XML parsing involves a substantial amount of string-matching operations, which are the most CPU intensive operations in XML parsing. Further, the memory requirements of parsing XML elements also lead to a substantial amount of inefficient memory allocation and de-allocation operations.

SUMMARY

The present invention provides an XML validating parser that can dynamically generate executable parsing codes based on information extracted from an XML schema document that is either stored locally or obtained from a remote machine via network. According to another aspect of the invention, a schema-based, reconfigurable parser is provided.

In one embodiment, each XML element of an XML document is parsed and validated using a dedicated executable parsing code ("parselet"), which navigates the structure of the XML element, its attribute values and constraints to validate the element. If the element is valid, the examined XML element is passed to a consuming application program requiring the XML document to be processed. Otherwise, an invalid exception is raised and the consuming application program is notified. Because parsing in this instance is performed in a compiled executable parselet, parsing is faster than the interpretive parsers of the prior art and the memory requirement for string matching can be much reduced.

According to one embodiment of the present invention, a lexicographical analysis of the XML elements is performed in advance for a given XML schema to provide: (1) state-transition sequence information, and (2) element and attribute lexicographical distance information. The transition sequence information can be used to guide the parser as to the XML elements that may be expected to follow according to the given schema. The element and attribute lexicographical distance measures a minimal lexicographical distance between two strings (i.e., the smallest indices in the strings sufficient to identify and distinguish the strings). This information is useful for guiding the parser to identify the element or attribute of the XML document using the minimal amount of string comparison.

In one embodiment of the present invention, pools of XML element objects having pre-determined element-attribute structures are created when the parser is instantiated, which are dynamically managed so that the sizes of the pools vary as needed. A schema analysis method provides memory requirement information to allow a parse tree of the XML document be built in memory as a DOM object using objects in the element object pools. The schema analysis also provides information for managing the sizes of element pools and the type of element objects in each pool. Having element object designs in the pools alleviate the parser's memory management requirements.

A parselet of the present invention is a compiled, executable code that executes much faster than a corresponding interpretive code which examines the schema tree and XML document tree at run time. In addition, the present invention provides multiple parselets for different XML elements, so that parallel processing of multiple XML elements simultaneously is possible. The compiled parselets may be used for multiple XML documents based on the same XML schema.

An XML schema-driven parser of the present invention may be configurable to output XML elements in the form of a DOM tree (or a similar parse tree), or in a stream, as appropriate, according to the consuming application program. The parse tree of the present invention need not provide in memory an entire DOM tree. The present invention allows a partial parse tree to be constructed on demand, including as little as a single element. Thus, the memory requirement may be reduced significantly while still allowing application programs to access XML document using DOM APIs.

By using minimal lexicographical distances between XML elements, string-matching operations are significantly reduced, thus significantly reducing the parser's demand on computational power.

By using pools of XML elements, significant amount of dynamic memory allocation operations may be avoided during parsing. When an element object is no longer needed (e.g. in the case of a streaming-based parsing), the element object is returned to the respective pool to be reused instead of being de-allocated. As a result of maintaining element pools, significant reductions in the requirements on CPU and memory resources are achieved. For example, the need for a garbage collector process—which does not reclaim memory from finalized objects immediately—may be avoided. Avoiding the need for a garbage collection process also reduces the requirements on the CPU.

The present invention is better understood upon consideration of the detailed description below and the accompanying drawings.

DETAILED DESCRIPTION OF THE PREFERRED EMBODIMENTS

The present invention provides a validating parser that validates an XML document as it is parsed, thereby reducing the validating and parsing time requirements and the memory bandwidth requirement. The present invention may be applied to implement a parser code generator and a reconfigurable parser.

Figure 1:
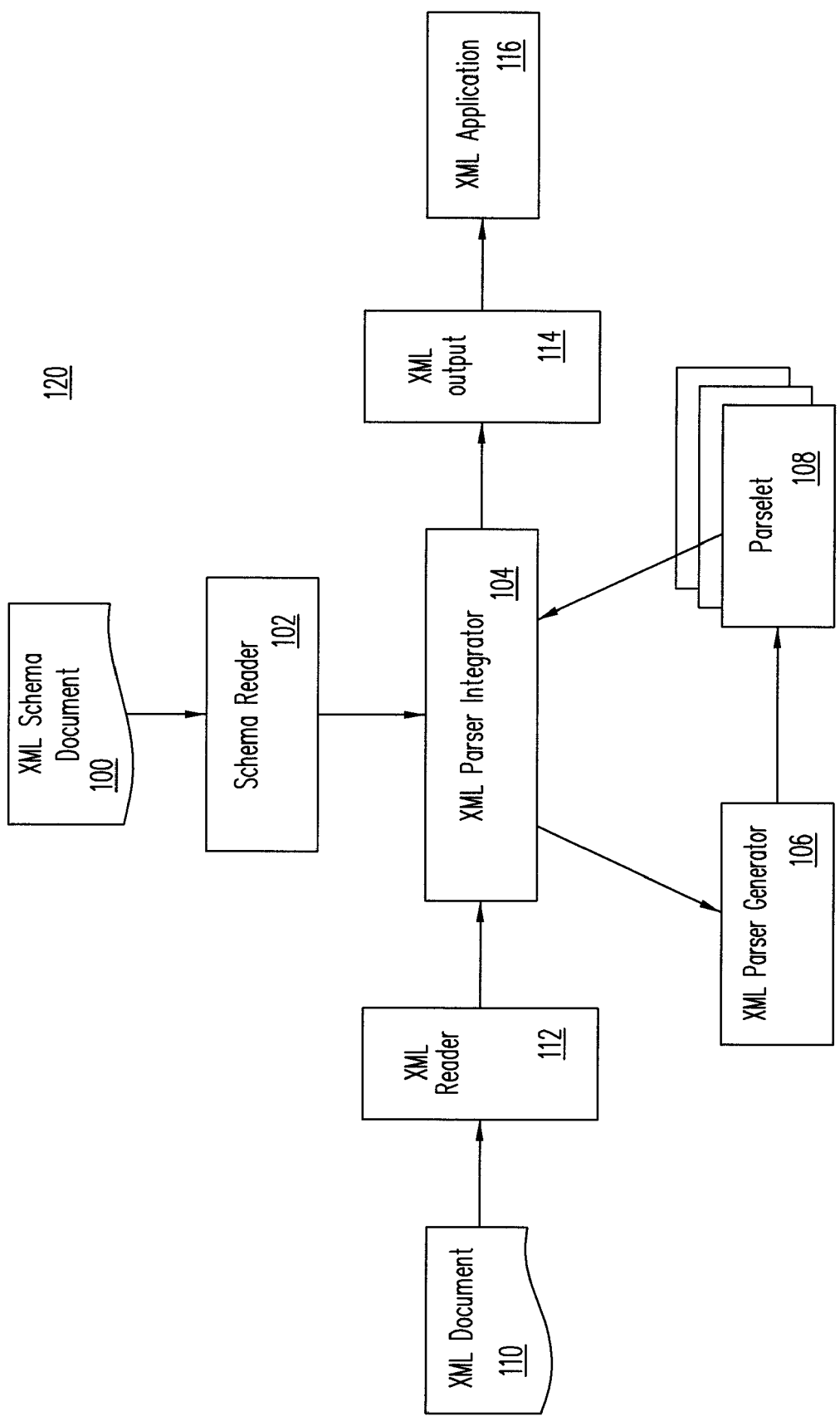
FIG. 1 is a block diagram of schema-driven parser generator system 120, according to one embodiment of the present invention.

According to one embodiment of the present invention, based on a specific XML schema, a validating parser generator dynamically generates an executable parser code ("parselet") for implementing parsing of a specific XML element in the XML schema. FIG. 1 is a block diagram of schema-driven parser generator system 120, according to one embodiment of the present invention. As shown in FIG. 1, schema-driven validating parser system 120 includes:

(1) schema reader 102, which reads one or more XML schema documents (e.g., XML document 100);
(2) XML reader 112, which reads XML documents (e.g., XML document 110);
(3) XML parser integrator 104, which coordinates among the different components of the XML parser (in this example, the XML parser consists of (a) XML parser integrator 104, (b) XML parser generator 106, and (c) parselets (e.g., parselet 108); and
(4) XML output module 114, which outputs validated, parsed XML elements of the XML document for use by XML application program 116.

Parselets (e.g., parselet 108) are executable parsing codes created by XML parser generator 106 based on XML elements read by schema reader 102 from XML schema document 100. Each parselet is called to parse an XML element in an XML document (e.g., XML document 110) and to extract element and attribute values from the XML element and all its included XML elements. The parsed elements are output by XML output module 114 to XML application program 116. Schema-driven XML parser system 120 is especially beneficial when multiple XML documents are based on the same underlying XML schema, so that each parselet can be re-used multiple times.

XML schema document 100 may be a document retrieved from a local storage or from a remote storage via a network (e.g., the Internet) using one of various network transport protocols (e.g., FTP, HTTP, and SSL). Schema reader 102 reads the XML elements from XML schema document 100 one element at a time. In this embodiment, if an element is nested (i.e., it contains other XML elements), the contained elements are read before reading of the containing element is complete. Schema reader 102 may implement a push style or a pull style of reading XML elements. Under a push style, schema reader 102 continuously read XML schema document 100 until an entire element is read, whereupon schema reader 102 notifies XML parser integrator 104. Under a pull style, XML parser integrator 104 requests that schema reader 102 read the next XML element from schema document 100.

When an entire element is completely read, XML parser integrator 104 causes XML parser generator 106 to generate a corresponding parselet for the XML element read. XML parser integrator 104 maintains a mapping table, which includes all relationships between a parselet, all its containing parselets and all the parselets it contains. In addition, the mapping table also records a name space and a qualified name for each parselet (a qualified name is typically a prefix encoding a path to the parselet).

An example XML document is a "PurchaseOrder" document, which is an XML element which includes other XML elements "shipTo", "billTo", "comment" and "items". Elements "shipTo" and "billTo" each include instances of elements "name", "street", "city", "state" and "zip". Element "items" may include one or more instances of element "item." Element "item" may include instances of elements "productName", "quantity" "USPrice", "comment" and "shipDate". One or more attributes may be found in each element, which values are provided by a string representing the appropriate data type. For example, element "PurchaseOrder" includes attribute "orderDate" and element "shipTo" includes attribute "country".

A schema may include, at the top level, elements "purchaseOrder" and "comment". Element "comment" is defined in the schema to be a string. Element "purchaserOrder" is defined in the schema to be an element of the data type "PurchaseOrderType", which is defined to include elements, sequentially, "shipTo", "billTo", "comment" and "items", and attribute "orderDate." The term "sequence" indicates the order in which the elements appears in the schema is expected to be the order in which those elements appear in the XML document. The schema further defines that the elements "shipTo" and "billTo" are both of the data type "USAddress", which is defined to include elements "name", "street", "city", "state" and "zip". The schema defines "name", "street", "city" and "state" each to be a string and "zip" to be of the data type "Decimal". Similarly, element "items" is defined in the schema to include zero or more instances of element "item". Element "item" includes, sequentially, elements "productName", "quantity", "USPrice", "comment" and "shipDate". Element "item" also has an attribute "partNum" which is of the data type "SKU"—a format for a part number which is also defined in the schema. The data type of element "item" is not provided a name. Using the information specified in such a schema, parser generator 106 generates the parse code for parsing the elements as they appear in the XML document.

Thus, XML parser generator 106 generates a parselet for an element "purchaseOrder" which includes also code generated for parsing all the included elements. Note that, in this embodiment, as the simple data types "string", "Decimal" and "Integer" and the various variations of the data type "Date" are encountered frequently in XML documents, the parse code for these data types are not generated specifically for every schema. Rather a base class "Parselet" is provided, and the specifically generated parselets, such as "purchaseOrder" is derived from the "Parselet" class, so that parse codes for these common data types are associated with every specifically generated parselet.

In a parselet class, the methods for parsing data types "string", "Decimal" and "Integer" and the various variations of "Date" are provided as "parseString", "parseDecimal" and "parseInteger" and "parseDate", respectively. In addition, methods for validating elements and attributes (e.g., "isElement" and "isAttribute") are also provided in class "Parselet". During parsing, "Parselet" keeps track of its progress through the XML document—i.e., where in the XML document is the current text object being parsed—by the method "EEMoveCursor". Error condition or "exception" handler "InvalidSchema" may be called from "Parselet". As discussed above, the output from the parsing operation may be a DOM tree, which is built from a number of DOM nodes interconnected from a root node.

According to the structure of the XML document "purchaseOrder" as defined in the XML schema, parselet "purchaseOrder" parses both elements "purchaseOrder" and "comment" at the top level of the schema. To parse element "purchaseOrder", the method "parsePurchaseOrderType" is called to handle the data type "purchaseOrderType". Method "parsePurchaseOrderType" parses, sequentially, the required attribute "OrderDate", and each of elements "shipTo", "billTo", "comment" and "items". As elements "shipTo" and "billTo" are both of the same data type "USAddress", parsing of each element is handled by method "parseUSAddress". Element "items" is handled by method "parseItems", which is also generated according to the structure defined in the schema. As the data type of element "item" contained in element "items" is not given a name, XML parser generator 106 gives the method for handling this data type the name "parseUnnamed1". Method "parseUnnamed1" parses, sequentially, the required attribute "partNum" and elements "productName", "quantity", "USPrice", "comment" and "shipDate". Note that the parsing code also validates each element including testing if the supplied values are within the accepted range of values for each element. Attribute "partNum" is parsed using the generated method "parseSKU". As each element is successfully parsed, a node corresponding to the element is added to the parse tree using a method "addChild" in a class "Node".

During actual parsing operation, when an element is read by XML reader 112 from XML document 110, a corresponding parselet (say, parselet 108) is selected from mapping table, based on the name space, the element's qualified name, and the relationships involving parselet 108. When parselet 108 completes its parsing task, the parsed XML element is forwarded to parser integrator 104, which passes the parsed element to XML output module 114.

According to one embodiment, parsed XML elements output from the parselets are validated against the elements' definitions in their respective schemas. Here, the term "parsed" may mean either (1) that the XML element has been converted into a structured data representation, such as a DOM tree, or (2) that the textual XML element has been validated by parselet 108 to conform its corresponding definition in the schema document. In the case of a DOM tree, an application program can directly access the XML element through XML output module 114. Alternatively, i.e., the validation of the textual XML element without more requires both lesser processing time and memory, relative to building a DOM tree.

Figure 2:
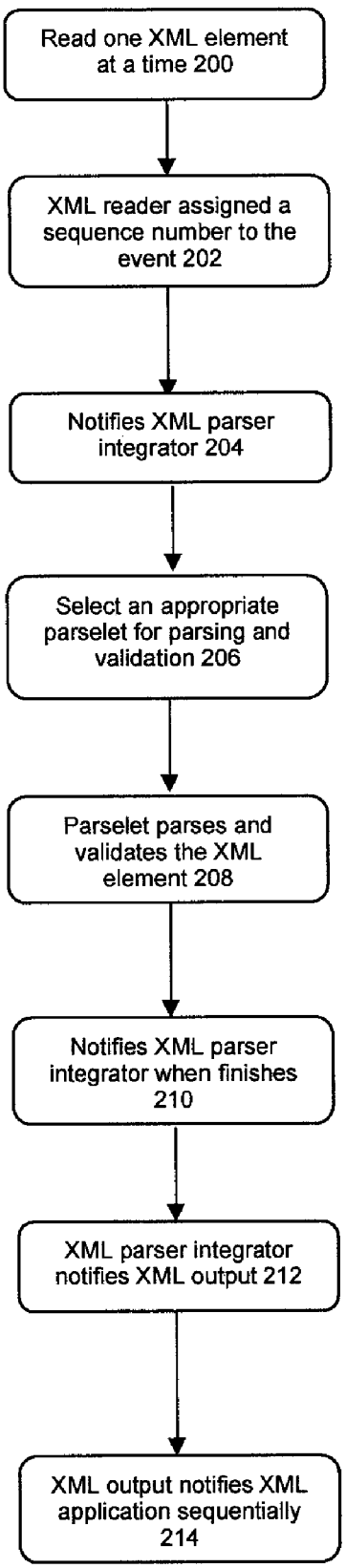
FIG. 2 is a flow chart illustrating the operations of schema-driven parser generator system 120 under push mode.

FIG. 2 is a flow chart illustrating the operations of schema-driven parser generator system 120 under push mode. As shown in FIG. 2, at step 200, XML reader 112 reads XML document 110 one element at a time. When XML element is completely read, XML reader 112 generates an event, which is assigned a sequence number at step 202. The sequence number may be provided in ascending order by a counter. At step 204, XML reader 112 notifies XML parser integrator 104 of the event. Upon notification of the event, at step 206, XML parser integrator 104 examines and uses the name space and qualified name of the XML element associated with the event to select from the mapping table an appropriate parselet. At step 208, the selected parselet parses and validates the XML element. The parselet may provide its output in a DOM tree structure, or simply provide a textual representation of the XML element, according to the requirement of XML application program 116. At step 210, the selected parselet notifies XML parser integrator 104 of the parsed XML element. XML parser integrator 104 then pass the result of the parsing, together with information regarding the event, to XML output module 114 at step 212. XML output module 114 maintains a queue of parsed elements sequentially of event sequence numbers. At step 214, XML output module 114 notifies application program 116 of the parsed element being added to the queue.

Figure 3:
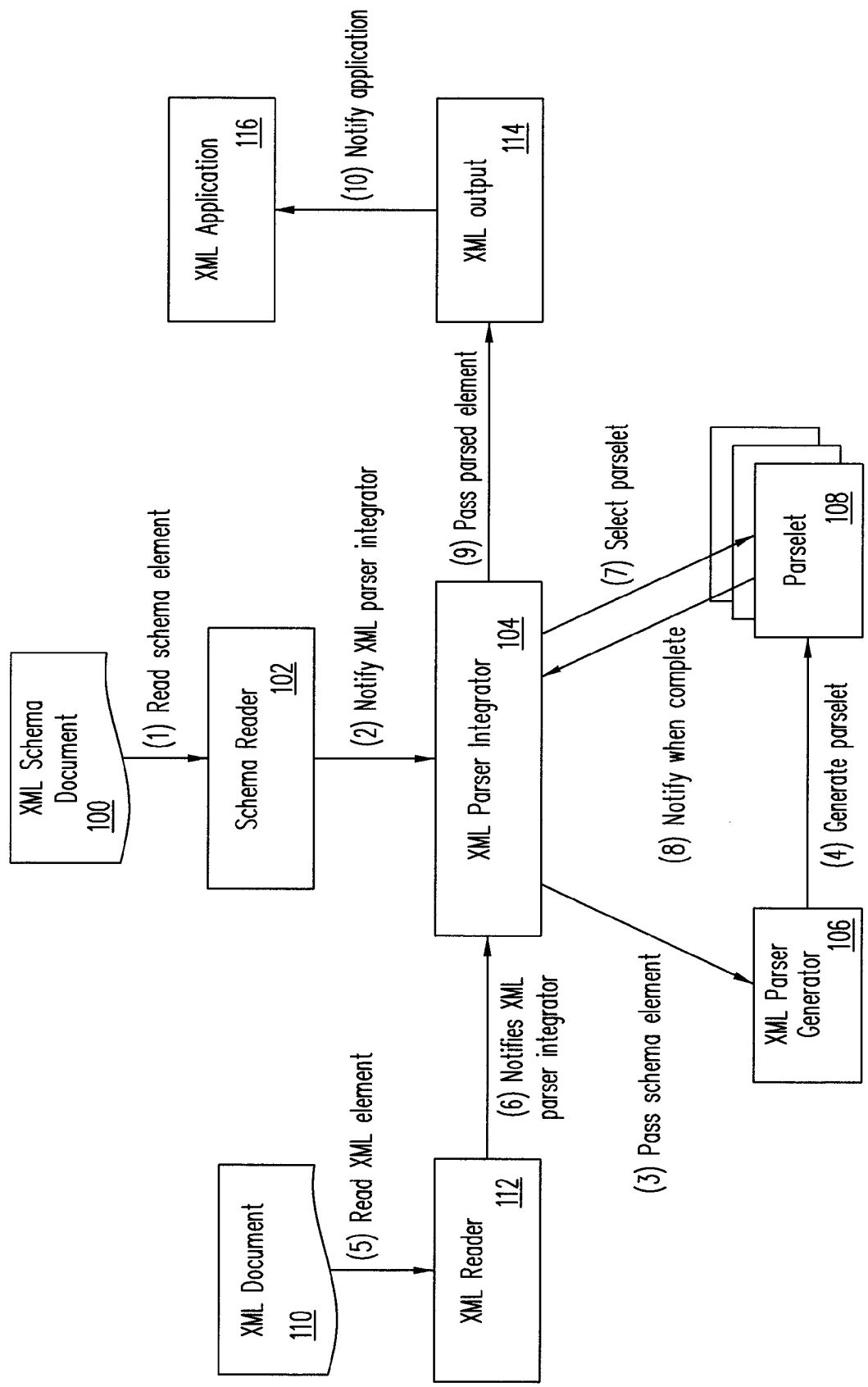
FIG. 3 summarizes the operations of schema-driven parser generator system 120 under push mode.

FIG. 3 summarizes the operations of schema-driven parser generator system 120 under push mode.

Figure 4:
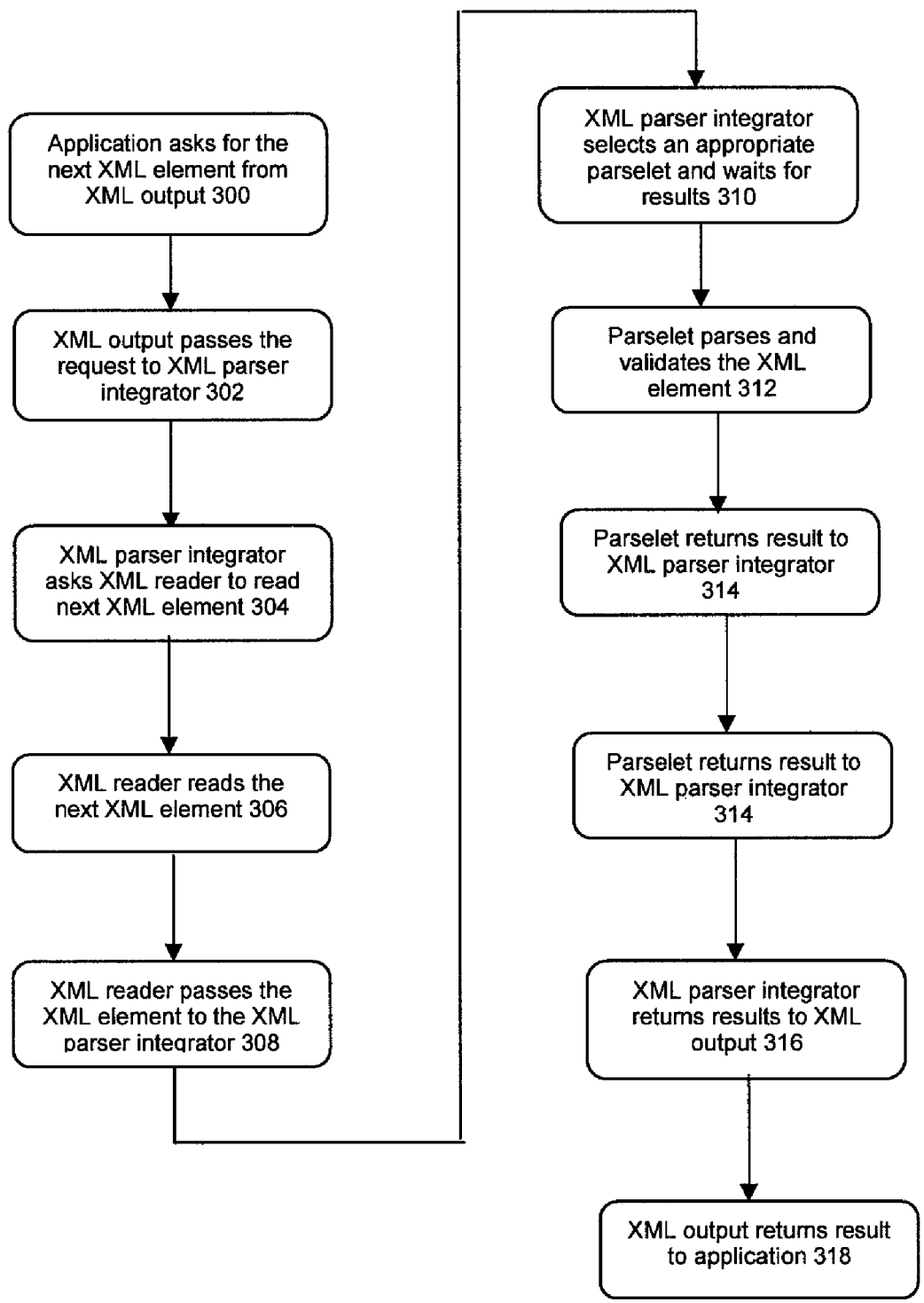
FIG. 4 is a flow chart illustrating the operations of schema-driven parser generator system 120 under pull mode.

FIG. 4 is a flow chart illustrating the operations of schema-driven parser generator system 120 under pull mode. As shown in FIG. 4, in the pull mode, XML application program 116 initiates the parsing and validating process by asking the XML output module 114 for the next XML element at step 300. XML output module 114 in turn requests the next XML element from XML parser integrator 104 at step 302. At step 304, XML parser integrator 104 then requests XML reader 112 read the next XML element from XML document 110, which is accomplished at step 306. At step 308, XML reader 112 passes the XML element read to XML parser integrator 104, which selects at step 310 corresponding parselet 108 for validation and parsing based on the XML element's name space and qualified name. At step 312, selected parselet 108 then parses and validates the XML element. As in the push mode, the parsed XML element may be represented in a DOM tree structure, or in a textual representation, according to the requirements of application program 116. Parselet 108 provides the parsed XML element to XML parser integrator 104 at step 314. At step 316, XML parser integrator 104 provides the parsed XML element to XML output module 114, which provides the parsed XML element to XML application program 116 at step 318.

Figure 5:
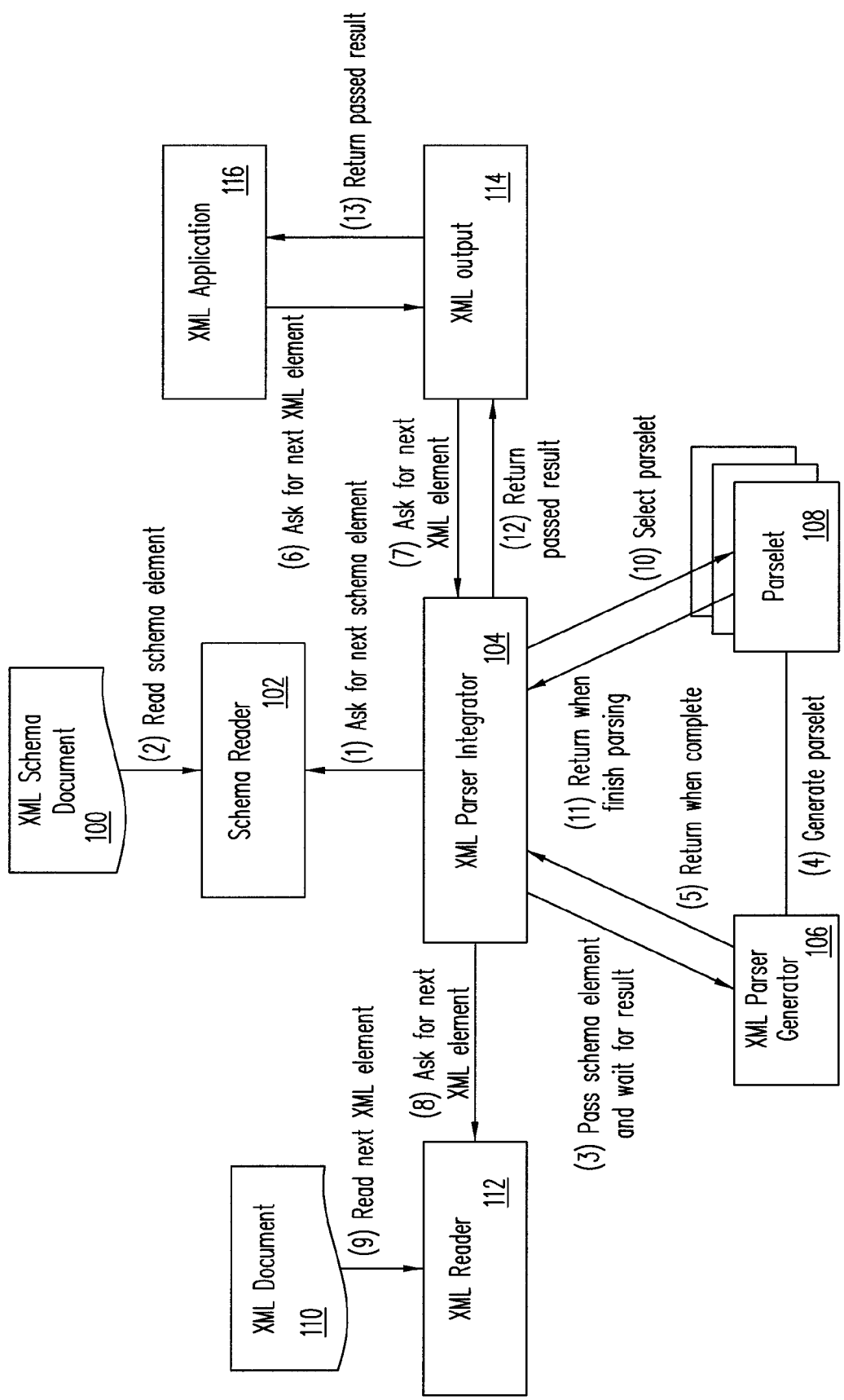
FIG. 5 summarizes the operations of schema-driven parser generator system 120 under pull mode.

FIG. 5 summarizes the operations of schema-driven parser generator system 120 under pull mode.

Figure 6:
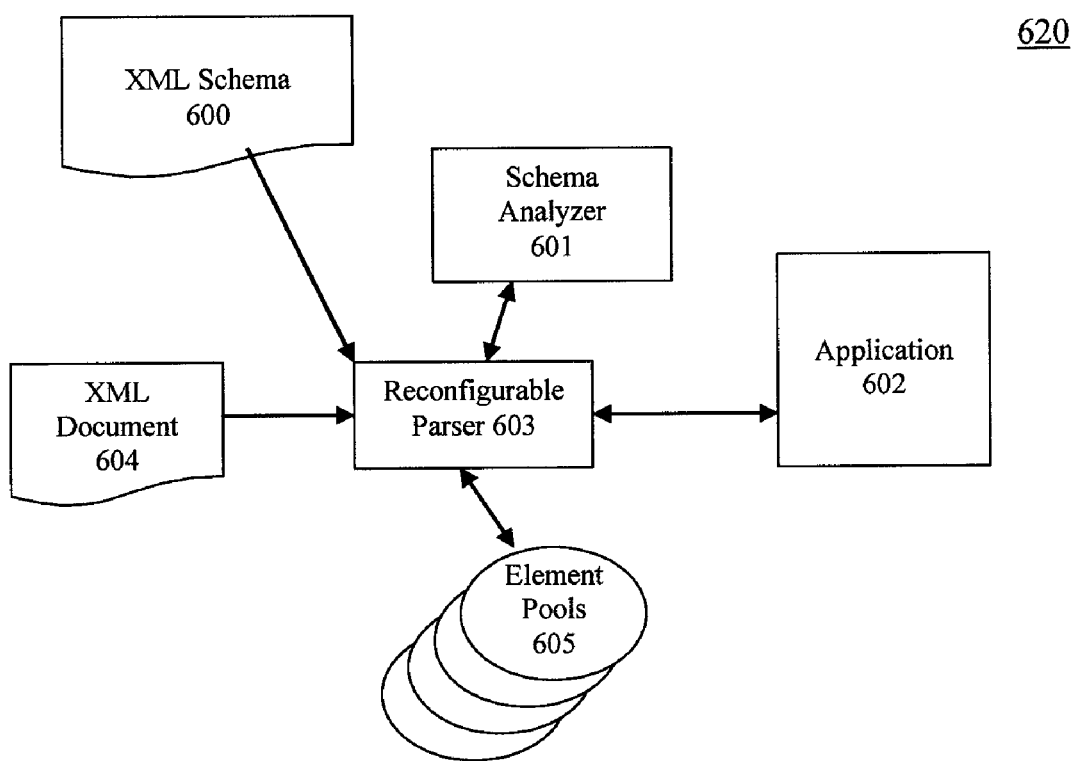
FIG. 6 shows dynamically reconfigurable parser system 620, according to another aspect of the present invention.

According to another aspect of the present invention, FIG. 6 shows dynamically reconfigurable parser system 620. As shown in FIG. 6, reconfigurable XML parser 603 uses schema analyzer 601 to obtain in lexicographical order XML elements defined in a schema document 600. Reconfigurable parser 603 then compares between every pair of adjacent XML elements to determine a minimal lexicographical distance between them. These minimal lexicographical distances guide reconfigurable parser 603 to identify XML elements during parsing. That is, reconfigurable parser 603 need only perform pattern-match sufficient to recognize the attribute or element being parsed. In addition to minimal lexicographical distances, schema analyzer 601 also provides state-transition information, such as a list of possible next elements that may appear in the XML document, as determined based on the current state.

Based on the information provided by schema analyzer 601, reconfigurable parser 603 parses XML document 604. According the present invention, reconfigurable parser 603 manages a number of element pools 605, which are created at system initialization according to the expected elements to be encountered. Each element pool includes a number of pre-allocated data structure ("XML element object") created from a template of an expected XML element. As each element is successfully parsed, an XML element object is retrieved from the appropriate element pool and assigned as a node in a parse tree. Element pools 605 are resizable and can vary in size dynamically, as reconfigurable parser 603 parses XML document 604, according to the size and complexity of XML document 604.

In one embodiment, application program 602 invokes XML parser 603 to parse XML document 604. Initially, reconfigurable parser 603 identifies the references in XML document 604 to XML elements defined in XML schema document 600. The schema references are provided schema analyzer 601 to retrieve previously extracted lexicographical and state-transition information corresponding to these references. Reconfigurable parser 603 then parses the XML references, requests XML element objects corresponding to the parsed elements from XML element pools 605, fills the XML element objects returned with the parsed data, links the XML element object to a parsed tree. When all XML references are parsed, the parse tree is provided to application program 602.

The above detailed description is provided to illustrate the specific embodiments of the present invention and is not intended to be limiting. Numerous modifications and variations within the present invention are possible. The present invention is set forth in the following claims.

We claim:

1. A method for parsing an XML document, comprising:
performing an analysis of the XML document from an XML schema associated with the XML document to extract one or more relationships between XML elements included in the XML document and to generate parselets for the XML elements, the parselets belonging to the group consisting of executable code and interpreted code; and
parsing the XML elements of the XML document using the parselets and guided by relationships extracted in the analysis.

2. A method as in claim 1, wherein the relationships extracted from the analysis comprises a lexicographical distance between XML elements.

3. A method as in claim 1, wherein the relationships extracted from the analysis comprises state-transition information.

4. A method as in claim 1, further comprising providing element object pools that are created upon system initialization.

5. A method as in claim 4, further comprising, upon parsing an XML element:
retrieving a corresponding element object from the element object pools; and
filling the element object with values extracted from the parsed XML element.

6. A method as in claim 5, further comprising providing the element object as a node in a parse tree.

7. A method as in claim 5, wherein the element object is returned to the element object pools.

8. A method as in claim 4, wherein each element object in the element object pools correspond to an expected data structure of an XML element defined in the XML schema.

9. A method for efficiently parsing an XML document, comprising:
analyzing a schema associated with the XML document to extract data structures of XML elements of the XML document;
generating parse code for each data structure of the XML elements, the parse code belonging to the group consisting of executable code and interpreted code; and
parsing the XML elements using the generated parse code as the XML document is read.

10. A method as in claim 9, wherein the generated parse code is compiled.

11. A method as in claim 9, further comprising reading the XML elements from the XML document one element at a time.

12. A method as in claim 11, wherein the XML elements are read into the parser according to a push model.

13. A method as in claim 11, wherein the XML elements are read into the parser according to a pull model.

14. A method as in claim 9, further comprising validating the XML elements against the XML schema.

15. A method as in claim 9, further comprising providing the parsed XML elements in a parse tree.

16. A method as in claim 9, further comprising providing the parsed XML elements one at a time in a continuous stream.

* * * * *